Patented Feb. 24, 1931

1,793,917

UNITED STATES PATENT OFFICE

HENRY B. FABER, OF BROOKLYN, NEW YORK, ASSIGNOR TO S. G. TURNBULL, OF ARLINGTON, NEW JERSEY

OXIDIZING OR DECOLORIZING AGENT AND METHOD OF MAKING SAME

No Drawing.    Application filed September 3, 1926.  Serial No. 133,512.

My invention is concerned with oxidizing or decolorizing agents and particularly with a new oxidizing or decolorizing agent and to the method of making the same.

I have discovered that if a dicarboxylic acid chlorid is mixed with a monocarboxylic acid chlorid in suitable proportions and oxygen substituted for the chlorin in the material there is produced in an inexpensive manner a product which has high oxidizing or decolorizing power.

In the practice of my invention based upon this discovery I prefer to substitute oxygen for chlorine in dicarboxylic and monocarboxylic acid chlorids wherein different organic radicals are present. Such acid chlorids may be represented by the following general formulæ: $R(COCl)_2$ and $2R'COCl$ respectively, wherein R represents an aliphatic hydrocarbon radical and R' represents an aromatic organic radical.

While various organic bodies may be used as starting materials I prefer to first produce dicarboxylic and monocarboxylic acid chlorids containing different organic radicals from inexpensive organic bodies and in the practice of my invention in its preferred form I prefer to start with fumaric acid and benzotrichlorid or other chlorid of the general formula $R'$-$CCL_3$, wherein $R'$ is an aromatic hydrocarbon radical. Fumaric acid is an olefin dicarboxylic acid and a waste product in a well known chemical industry. Besides being of the desired chemical constitution to be readily transformed into a dicarboxylic acid chlorid, it is extremely cheap.

In carrying out my process in its preferred form I mix the fumaric acid with the benzotrichlorid in the proportions of one molecule of the former to two molecules of the latter, the resulting product comprising olefin dicarboxylic acid chlorid and monobenzocarboxylic acid chlorid. The reaction is believed to be represented by the following equation:

$$C_2H_2(COOH)_2 + 2C_6H_5CCl_3 = C_2H_2(COCl)_2 + 2C_6H_5COCl + 2HCl$$

The fumaric acid and benzotrichlorid should be free from water and their reaction carried out at a preferred temperature of about from 140° C. to 170° C., the materials being preferably agitated while the reaction is in progress. The reaction is continued until the fumaric acid is transformed into the olefin dicarboxylic acid chlorid and the benzotrichlorid transformed into the monobenzocarboxylic acid chlorid. With ordinary agitation two to three hours is generally sufficient to produce approximately quantitative yields of these acid chlorids.

I then react upon the dicarboxylic and the monocarboxylic acid chlorids to substitute oxygen for the chlorine therein. For this substitution of oxygen for the chlorine any suitable reagents and methods may be used but I prefer to do this with hydrogen peroxid preferably employing a cold 3 per cent. solution of hydrogen peroxid and an alkali metal base preferably sodium carbonate, in the approximate proportions indicated by the following equation which is believed to represent the reaction which occurs:

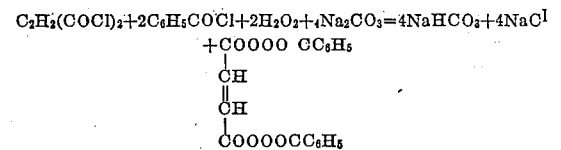

I have found it to be advantageous to use about 10 per cent. in excess of the theoretical quantity of hydrogen peroxid indicated by the above equation and to carry out the reaction with agitation at a temperature of from approximately 0° C. to 10° C., for about 30 minutes. With the use of less sodium carbonate than indicated by the above equation, some carbon dioxid is set free, thereby not only saving chemicals but also maintaining the solution at the optimum acidity. The substitution of oxygen for the chlorine may, however, be efficiently carried out in other ways as will be clearly apparent to those skilled in the art.

The resulting product differs materially from that produced by the similar treatment of the di- or the monocarboxylic acid chlorids alone. It is believed to be an entirely new chemical product. It is complicated in structure and its exact chemical nature is uncertain. It is, however, relatively stable, has pronounced oxidizing action and has been found to be an active and efficient bleaching agent for organic materials such as animal, vegetable and mineral oils, cereals, cereal products and various vegetable materials.

While I have described in detail the preferred practice of my process it is to be understood that the procedure may be variously modified and that my invention is not limited to the preferred embodiment as hereinbefore described except as set forth in the appended claims.

I claim:

1. The herein described process of preparing an organic peroxid which comprises substituting oxygen for chlorine in material comprising an aliphatic dicarboxylic acid chlorid and an aromatic monocarboxylic acid chlorid by treating such material with hydrogen peroxid and an alkaline substance.

2. The herein described process of preparing an organic peroxid which comprises substituting oxygen for chlorine in material comprising an aliphatic dicarboxylic acid chlorid and an aromatic monocarboxylic acid chloride in the approximate proportions of one molecule of the former to two molecules of the latter, by treating such material with hydrogen peroxid and an alkaline substance.

3. The herein described process of preparing an oxidizing agent comprising substituting oxygen for chlorine in material having the general composition $$R(COCl)_2 + 2R'COCl,$$

wherein R represents an aliphatic hydrocarbon radical and R' represents an aromatic hydrocarbon radical, by treating such material with hydrogen peroxid and an alkaline substance.

4. The herein described process of preparing an organic peroxid comprising substituting oxygen for chlorine by treating a product resulting from the reaction of an aliphatic dicarboxylic acid and an organic aromatic trichlorid of the type $R-CCl_3$, wherein R represents an aromatic hydrocarbon radical, with hydrogen peroxid in the presence of a weakly basic solution.

5. The herein described process of preparing an organic peroxid of the type $$R(COOOOCR')_2,$$

comprising reacting upon a dicarboxylic acid of the general formula $R(COOH)_2$ with an organic trichlorid of the general formula $R'-CCl_3$, wherein R represents an aliphatic hydrocarbon radical and R' an aromatic hydrocarbon radical, and treating the resulting material with hydrogen peroxid and an alkaline substance to substitute oxygen for the chlorine therein.

6. The herein described process of preparing an insoluble organic peroxid comprising reacting upon an olefin dicarboxylic acid with an organic trichlorid of the type $R-CCl_3$, wherein R represents an aromatic hydrocarbon radical, and reacting upon the resulting material with hydrogen peroxid and an alkaline substance to substitute oxygen for chlorine therein.

7. The herein described process of preparing an oxidizing agent comprising reacting upon fumaric acid with benzotrichlorid, and reacting upon the resulting material with hydrogen peroxid to substitute oxygen for the chlorine therein.

8. The herein described process of preparing an oxidizing agent comprising heating an olefin dicarboxylic acid and an organic trichlorid of the type $R-CCl_3$, wherein R represents an aromatic hydrocarbon radical, in the approximate proportions of one molecule of the former to two molecules of the latter, and reacting upon the resulting material with hydrogen peroxid and an alkaline substance to substitute oxygen for the chlorine therein.

9. The herein described process of preparing an oxidizing agent comprising heating fumaric acid and benzotrichlorid in the approximate proportions of one molecule of the former to two molecules of the latter, and treating the resulting material with hydrogen peroxid in the presence of a weakly basic solution to substitute oxygen for the chlorine therein.

10. The herein described product resulting from the substitution of oxygen for chlorine in material having the general composition $R(COCl)_2 + 2R'COCl$, wherein R represents an aliphatic hydrocarbon radical and R' represents an aromatic hydrocarbon radical, by treating the material with hydrogen peroxid and an alkaline agent, such product being relatively stable, possessing high decolorizing value, relatively insoluble in water and most organic solvents, and having a composition of the type $R(COOOOCR')_2$.

11. The herein described product resulting from the substitution of oxygen for chlorine in material of the general composition $C_2H_2(COCl)_2 + 2C_6H_5COCl$, by treating the material with hydrogen peroxid and an alkaline agent, such product being relatively stable, possessing high decolorizing value, and having the composition $C_{18}H_{12}O_8$.

12. The herein described product resulting from the substitution of oxygen for chlorine in the reaction product of an aliphatic dicarboxylic acid and an organic trichlorid of the type $R'-CCl_3$ by treating such reaction product with hydrogen peroxid and an alkaline material, such product being relatively stable, possessing high decolorizing value, and having a composition of the type $R(COOOOCR')_2$, R representing an aliphatic hydrocarbon radical and R' representing an aromatic hydrocarbon radical.

In testimony whereof I affix my signature.

HENRY B. FABER.